US011573689B1

(12) United States Patent
Jindal et al.

(10) Patent No.: US 11,573,689 B1
(45) Date of Patent: Feb. 7, 2023

(54) TRACE LAYER FOR REPLICATING A SOURCE REGION OF A DIGITAL IMAGE

(71) Applicant: Adobe Inc., San Jose, CA (US)

(72) Inventors: Amol Jindal, Patiala (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/507,105

(22) Filed: Oct. 21, 2021

(51) Int. Cl.
*G06F 3/048* (2013.01)
*G06F 3/04845* (2022.01)
*G06F 3/04842* (2022.01)

(52) U.S. Cl.
CPC ...... *G06F 3/04845* (2013.01); *G06F 3/04842* (2013.01); *G06F 2203/04804* (2013.01)

(58) Field of Classification Search
CPC ............. G06F 2203/04105; G06F 2203/04804
See application file for complete search history.

(56) References Cited

U.S. PATENT DOCUMENTS

| | | | | |
|---|---|---|---|---|
| 9,779,531 | B1* | 10/2017 | Kumar | G06T 11/60 |
| 11,294,556 | B1* | 4/2022 | Jindal | G06F 3/04845 |
| 2013/0145298 | A1* | 6/2013 | Oh | G06T 11/60 |
| | | | | 715/771 |
| 2013/0222666 | A1* | 8/2013 | Rydenhag | H04N 5/232935 |
| | | | | 348/333.02 |
| 2014/0362103 | A1* | 12/2014 | Kitsunai | H04N 1/00456 |
| | | | | 345/589 |
| 2015/0160839 | A1* | 6/2015 | Krishnaswamy | G06F 3/0482 |
| | | | | 715/810 |
| 2015/0286288 | A1* | 10/2015 | Lee | G06F 3/03 |
| | | | | 345/173 |
| 2020/0250453 | A1* | 8/2020 | Gupta | G06F 3/0482 |
| 2022/0122308 | A1* | 4/2022 | Kalarot | G06T 5/20 |

OTHER PUBLICATIONS

Hasinoff et al., Search-and-Replace Editting for Personal Photo Collections, 2010. IEEE, 8 page.*
Adobe, Adobe Photoshop Elements Help, 2019, Adobe Co., 166 page.*
"Adobe Lightroom", Adobe, Inc. [retrieved Sep. 20, 2021]. Retrieved from the Internet <https://www.adobe.com/products/photoshop-lightroom.html>., Feb. 19, 2007, 9 Pages.

(Continued)

*Primary Examiner* — Linh K Pham
(74) *Attorney, Agent, or Firm* — FIG. 1 Patents

(57) ABSTRACT

Techniques are described for trace layer for replicating a source region of a digital image. In an implementation, a user leverages a content editing system to select a source region of a source image to be replicated and a target region of a target image to which portions of the source region are to be replicated. A trace layer is generated that is a visual representation of portions of the source region, and the trace layer is positioned on the target region of the target image. Further, the trace layer is generated based on a visibility factor such that the trace layer is at least partially transparent. The trace layer receives user interaction to select portions of the trace layer and visibility of the selected portions is modified to replicate corresponding portions of the source region to the target region.

20 Claims, 12 Drawing Sheets
(6 of 12 Drawing Sheet(s) Filed in Color)

(56) References Cited

OTHER PUBLICATIONS

"Adobe Lightroom Clone", Adobe, Inc. [retrieved Sep. 20, 2021]. retrieved from the Internet <https://helpx.adobe.com/lightroom-classic/lightroom-key-concepts/clone.html>., May 13, 2019, 3 Pages.
"PicsArt", PicsArt, Inc. [retrieved Sep. 20, 2021]. Retrieved from the Internet <https://picsart.com/>., Nov. 2011, 3 Pages.
"Snapseed App", Snapseed [retrieved Sep. 20, 2021]. Retrieved from the Internet <https://snapseed.online/>., Jun. 2011, 10 Pages.

\* cited by examiner

900

```
┌─────────────────────────────────────────┐
│                  902                    │
│ Determine that a resize event occurs    │
│ based on input to a trace layer         │
└─────────────────────────────────────────┘
                    │
                    ▼
┌─────────────────────────────────────────┐
│                  904                    │
│       Generate a resized trace layer    │
└─────────────────────────────────────────┘
```

*Fig. 9*

TRACE LAYER FOR REPLICATING A SOURCE REGION OF A DIGITAL IMAGE

BACKGROUND

Persons today are afforded a variety of different options for digital image editing, such as via applications that enable digital content creation and editing. As part of editing digital content users often wish to copy a portion of a digital image and paint the portion over another portion of the digital image or on a different digital image. For instance, to remove an unwanted visual feature from a digital image, a user copies another portion of the image such as a background portion and utilizes the copied portion to cover the unwanted visual feature.

Conventional techniques for copying portions of an image onto another portion of the image experience a number of drawbacks. For instance, in some conventional techniques a user input modality used to insert a copied image portion in another image region obscures a target region and thus results in inexact copying. For example, where a user provides touch input to insert a copy of an image portion, the user's finger obscures a target copy region and thus results in off-target insertion of a copied image portion.

In another example using conventional techniques, a user copies an image portion and then zooms in on a target image region for inserting the copied image portion. However, in zooming in on the target image region, a source image region from which the copied image portion was taken is no longer visible. Since the source image region is no longer visible the user is faced with guessing at how the source image region is to be inserted into the target image region. Accordingly, in attempting to utilize conventional techniques for copying an image portion to another image region, users encounter frustration and imprecise copying of an image portion often results. This not only provides a less than optimal user experience but wastes system resources utilized to repeatedly attempt to insert a copied image portion into a target region to achieve an image editing objective.

SUMMARY

Techniques are described for trace layer for replicating a source region of a digital image. In an implementation, a user leverages a content editing system to select a source region of a source image to be replicated and a target region of a target image to which portions of the source region are to be replicated. A trace layer is generated that is a visual representation of portions of the source region, and the trace layer is positioned on the target region of the target image. Further, the trace layer is generated based on a visibility factor such that the trace layer is at least partially transparent. The trace layer receives user interaction to select portions of the trace layer and visibility of the selected portions is modified to replicate corresponding portions of the source region to the target region.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 9 depicts a procedure in an example implementation for resizing a trace layer.

DETAILED DESCRIPTION

Overview

Figure 1:
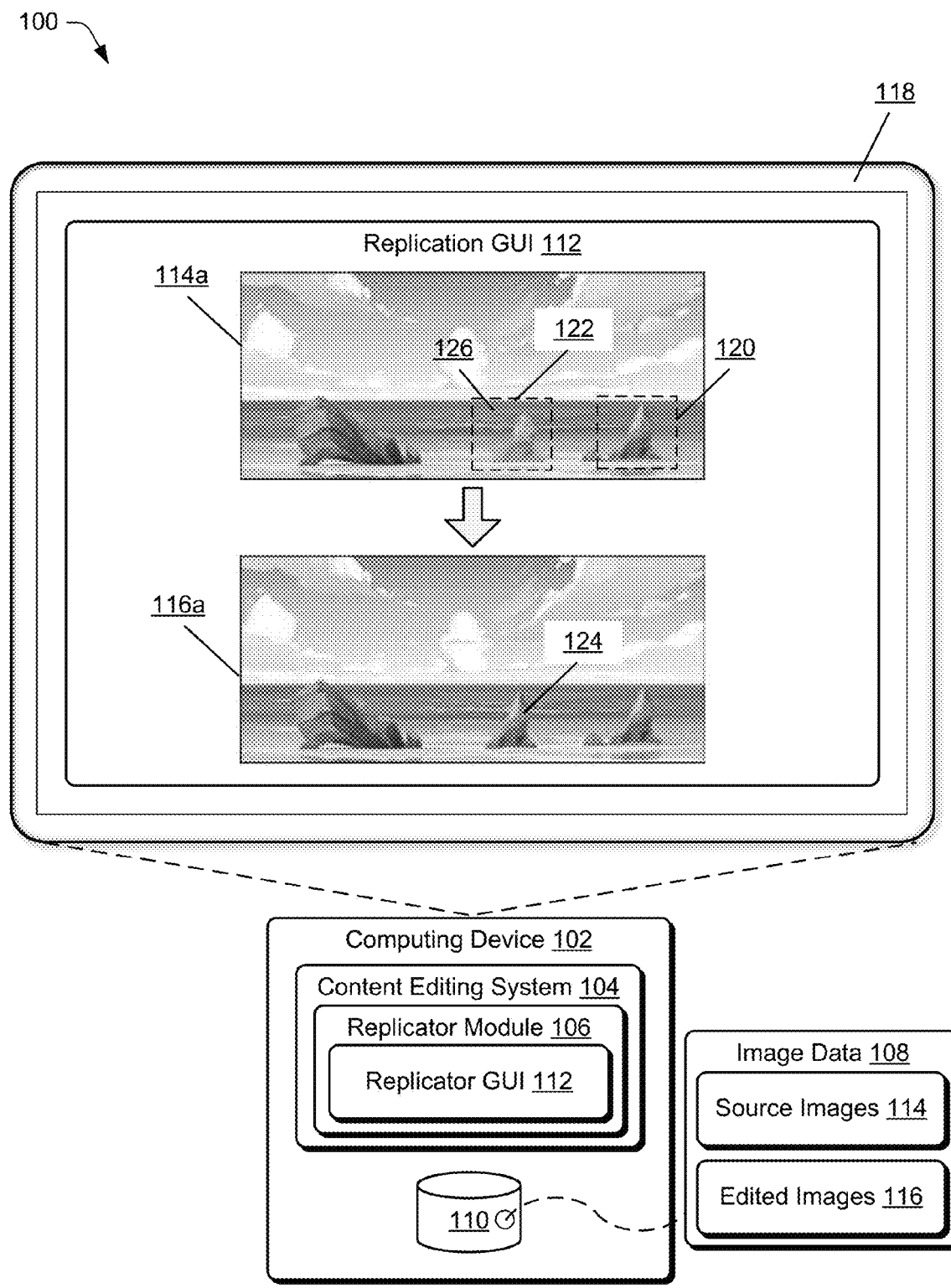
FIG. 1 is an illustration of a digital medium environment in an example implementation that is operable to employ trace layer for replicating a source region of a digital image techniques described herein.

The ability to copy a portion of a digital image and insert the copied portion in a region of a digital image provides content editors with the ability to apply a variety of different edits to digital images. Conventional techniques for copying portions of an image onto another portion of the image experience a number of drawbacks. For instance, an input technique utilized by conventional techniques may obscure a region of an image that is being edited. Further, when a user zooms in on a digital image utilizing a conventional technique the user typically loses visibility of a source region from which a portion of a digital image is copied. Accordingly, designers are often required to manually attempt multiple copy operations and often are unable to achieve an original image editing objective. Thus, conventional techniques are labor intensive and prone to inaccuracies in copying and positioning portions of digital images and thus result in inefficient use of user and system resources.

Accordingly, techniques are described for trace layer for replicating a source region of a digital image that overcome the challenges experienced in conventional systems for copying portions of digital images. In an implementation, a user leverages a content editing system to select a source region of a source image to be replicated and a target region of a target image to which portions of the source region are to be replicated. In at least one implementation the target image represents the same image as the source image, or a different digital image. A trace layer is generated that is a visual representation of portions of the source region, and the trace layer is positioned on the target region of the target image. Further, the trace layer is generated based on a visibility factor such that the trace layer is at least partially transparent. For instance, the trace layer presents a transparent visual representation of the source region such that portions of the target region are visible through the trace layer.

Further to the described techniques the trace layer receives user input to select portions of the trace layer to be replicated to the target region. For instance, a user selects portions of the trace layer and the content editing system modifies the visibility of the selected portions to decrease transparency the selected portions. In at least one implementation the selected portions are rendered opaque utilizing their original colors from the source region. Pixel color values from corresponding portions of the source region, for example, are replicated to the selected portions of the trace layer on the target region.

According to various implementations a trace layer is resizable to present additional portions of a selected source region. For instance, based on user input to select portions of a trace layer a resize event occurs indicating that the trace layer is to be resized, e.g., increased in size from an initial size. Generally, a resize event is triggerable based on different input conditions such as user input to a trace layer reaching a threshold proximity to a perimeter of the trace layer, user input reaching a threshold distance from a center of the trace layer, and so forth. Accordingly, based on the resize event the content editing system resizes the trace layer to include a visual representation of additional portions of a designated source region. The content editing system enables a user to interact with the resized trace layer to select additional portions of the source region for replication to the target region. Thus, based on user interaction with the trace layer an edited version of the target image is generated that includes portions of a source region selected from the trace layer and replicated to the target region.

Accordingly, the techniques described herein overcome challenges to copying and placing visual features experienced in conventional systems. For instance, by providing a trace layer representation of a source region of an image on a target region a user is able to view a representation of the source region and interact with the trace layer to select which portions of the source region are to be replicated to the target region. Generally, this represents in increase in usability and efficiency over conventional systems since a user need not manually attempt multiple copy operations to achieve a particular image editing objective. Among other improvements, this reduces the burden on system resources (e.g., processors, memory, network bandwidth, and so forth) that are allocated to enabling visual portions of an image to be copied to a target region of an image.

Term Definitions

These term definitions are provided for purposes of example only and are not intended to be construed as limiting on the scope of the claims.

As used herein, the terms "source image" and "target image" refer to digital images that are usable to perform digital content generation and editing. In at least one implementation a source image represents the same digital image as a target image. Alternatively a source image and a target image are different respective digital images.

As used herein, the term "source region" refers to a region of a source digital image that is selected for replication to a "target region" of a digital image.

As used herein the term "trace layer" represents data that is generated to visually represent portions of a source region. A trace layer, for instance, is generated as an at least partially transparent representation of a source region of a digital image. Further, the trace layer is able to receive user interaction to replicate portions of the source region to a selected target region. For instance, user interaction with the trace layer modifies visibility of selected portions of the trace layer such as by decreasing transparency of the selected portions and/or rendering the selected portions opaque utilizing duplicated pixel color values from a respective source region.

In the following discussion, an example environment is described that employs the techniques described herein. Example systems, implementation scenarios, and procedures are also described which are performable in the example environment as well as other environments. Generally, performance of the example procedures is not limited to the example environment and the example environment is not limited to performance of the example procedures.

Example Environment

FIG. 1 is an illustration of a digital medium environment 100 in an example implementation that is operable to employ trace layer for replicating a source region of a digital image techniques described herein. The illustrated environment 100 includes a computing device 102 which is configurable in a variety of ways. The computing device 102, for instance, is configurable as a desktop computer, a laptop computer, a mobile device (e.g., assuming a handheld configuration such as a tablet or mobile phone as illustrated), and so forth. Additionally, although a single computing device 102 is shown, the computing device 102 is implementable via a plurality of different devices, such as multiple servers utilized by an entity to perform operations "over the cloud" as described in FIG. 11.

The computing device 102 is illustrated as including content editing system 104, which is representative of functionality for generating and editing digital content, such as digital images. Although illustrated as implemented locally at the computing device 102, functionality of the content editing system 104 is also implementable in whole or part via functionality available via a network, such as part of a web service and/or in a cloud-based implementation. The content editing system 104 includes a replicator module 106 that is implemented to enable portions of a digital image to be replicated and inserted into a region of a digital image. The computing device 102 also includes image data 108 stored on a storage 110 and which is utilized and/or generated by the content editing system 104 via the replicator module 106.

To enable various functionality described herein, the replicator module 106 includes a replication graphical user interface (GUIs) 112. The replicator GUI 112, for instance, represents functionality for enabling user interaction with the content editing system 104, such as for invoking functionality of the replicator module 106.

The image data 108 represents data generated and utilized by the replicator module 106 and includes source images 114 and edited images 116. The source images 114 represent digital images that are obtainable from various sources, such as locally from the storage 110, remotely from a network-based source of digital images, and so forth. The edited images 116 represent edited versions of the source images 114, e.g., source images 114 that are visually transformed via interaction with the content editing system 104.

The computing device 102 further includes a display device 118 on which the replicator GUI 112 is displayed. Generally, the replicator GUI 112 enables a user to select a source image 114 and to edit the source image 114 to generate an edited image 116. For instance, in this example a user selects a source image 114a for editing. As part of editing the source image 114a the user invokes the replicator module 106 to select a source region 120 of the source image 114a. The user then selects a target region 122 of the source image 114a for insertion of portions of the copied source region 120. Accordingly, in conjunction with selection of the target region 122 the replicator module 106 generates a trace layer 126 and positions the trace layer 126 on the target region 122. Generally, the trace layer 126 enables a user to specify portions of the source region 120 to be inserted into the target region 122. A user, for example, interacts with the trace layer 126 to specify which portions of the source region 120 are to be replicated into the target region 122 to generate a replicated portion 124 of the source region 120.

Based on user interaction with the trace layer 126 an edited image 116a is generated. The edited image 116a, for example, represents the source image 114a with the replicated portion 124 inserted at the target region 122.

In general, the described systems and modules are implementable at least partially in hardware of a computing device, such as the computing device 102. Further, functionality, features, and concepts described in relation to the examples above and below are employable in the context of the example procedures. Additionally, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Systems and Implementation Scenarios

The following discussion describes example systems and implementation scenarios for trace layer for replicating a source region of a digital image. Aspects of each of the systems and scenarios are implementable in hardware, firmware, software, or a combination thereof.

Figure 2A:
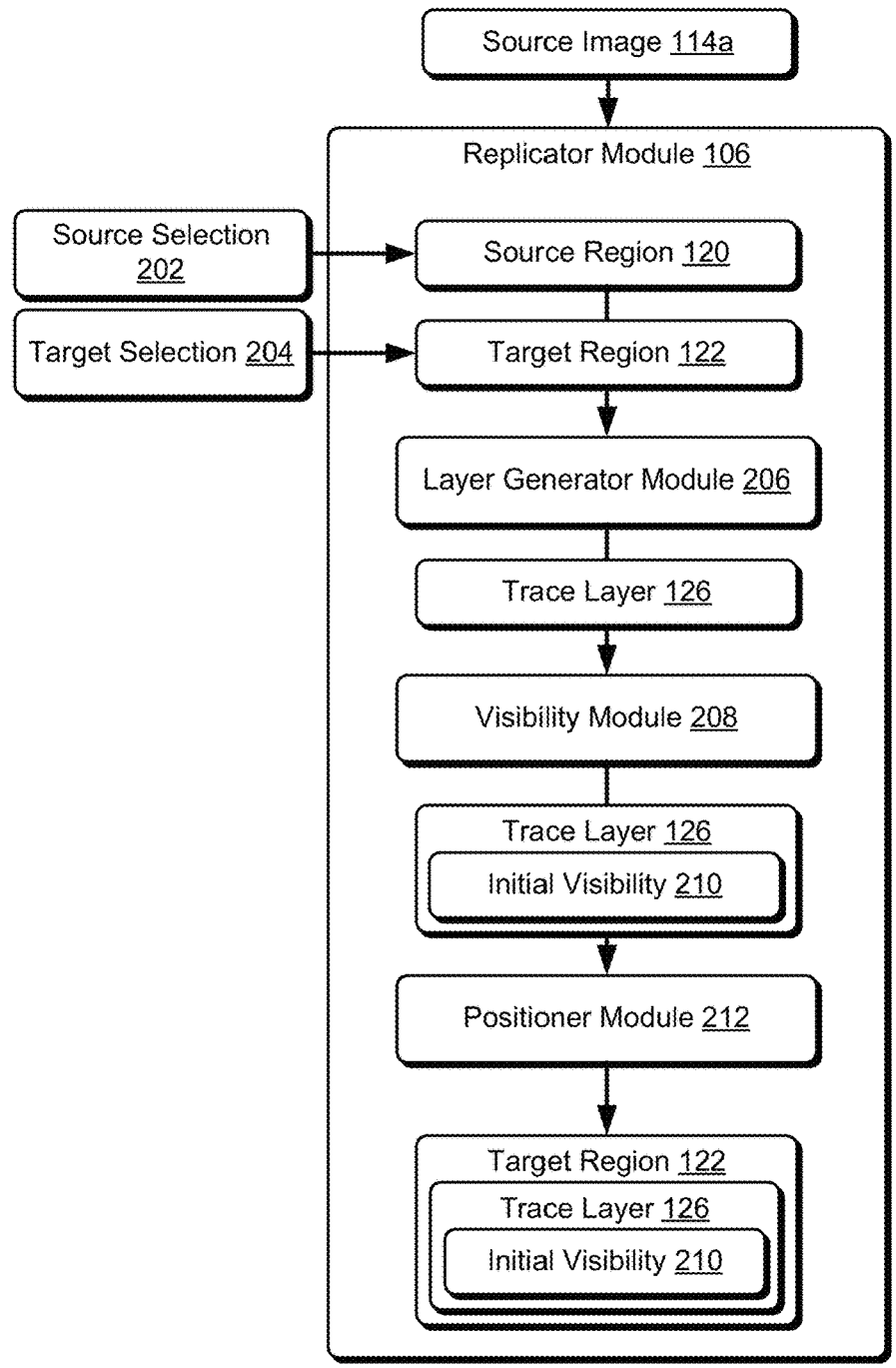
FIGS. 2a, 2b, depict aspects of example systems for performing trace layer for replicating a source region of a digital image.
Figure 2B:
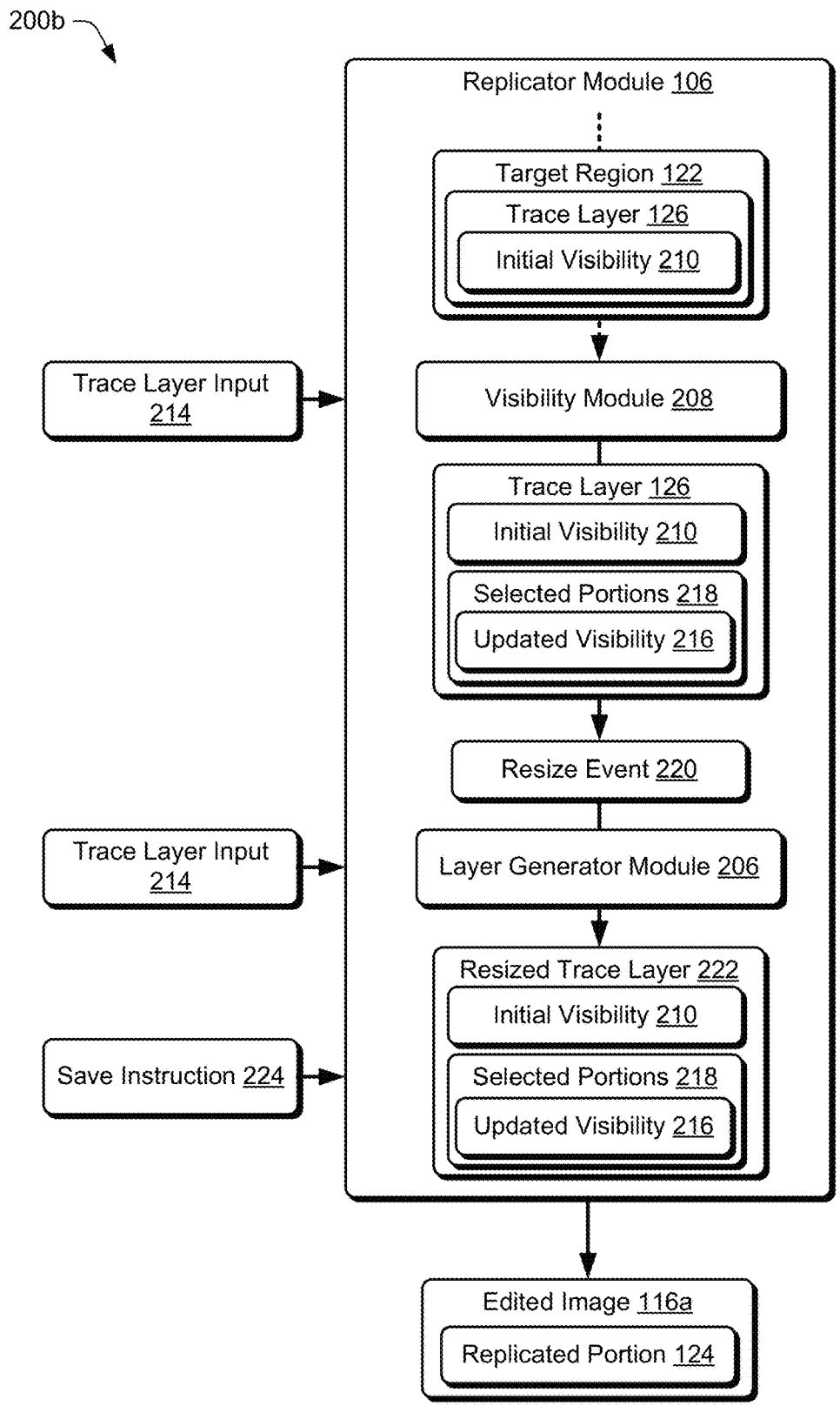

FIGS. 2a, 2b, depict aspects of example systems for performing trace layer for replicating a source region of a digital image. FIG. 2a, for instance, depicts a system 200a for generating a trace layer for inserting a portion of source content into an image in accordance with one or more implementations. In the system 200a the replicator module 106 identifies the source image 114a and a source selection 202 to select the source region 120 from the source image 114a. A user, for example, selects the source image 114a from the source images 114 and selects the source region 120 as a portion of the source image 114a to be replicated, e.g., to another region of the source image 114a. The replicator module 106 then receives a target selection 204 selecting the target region 122 for replication of the source region 120. For instance, after selection of the source region 120 a user selects the target region 122 as a region of the source image 114a for insertion of visual attributes of the source region 120.

In response to selection of the target region 122 a layer generator module 206 generates the trace layer 126 which represents a visual representation of the source region 120. In at least one implementation and as further detailed below, an initial size of the trace layer 126 is based on an input functionality used to interact with the trace layer 126. For instance, the content editing system 104 provides brushes that enable user interaction to edit digital content, and a size of the trace layer 126 is determined based on a size of an active brush tip.

Further to the system 200a a visibility module 208 determines an initial visibility 210 for the trace layer 126. The initial visibility 210, for example, indicates how the trace layer 126 will be initially visually presented at the target region 122. For instance, the initial visibility 210 indicates a visibility factor (e.g., a transparency value and/or a translucency value) to apply to the trace layer 126 such that both the trace layer 126 and underlying portions of the target region 122 are visible. Accordingly, the trace layer 126 is generated with the initial visibility 210 and a positioner module 212 positions the trace layer 126 on the target region 122. For instance, the positioner module 212 centers the trace layer 126 on an input point used to identify the target region 122.

FIG. 2b depicts an example system 200b for generating an edited image based on user interaction with a trace layer in accordance with one or more implementations. The system 200b, for instance, is implemented in conjunction with the system 200a. In the system 200b, with the trace layer 126 positioned on the target region 122 a user applies trace layer input 214 to the trace layer 126. The trace layer input 214, for instance, indicates portions of the source region 120 to be replicated to the target region 122. Based on the trace layer input 214 the visibility module 208 determines updated visibility 216 for selected portions 218 of the trace layer 126 selected via the trace layer input 214. The updated visibility 216, for example, modifies the initial visibility 210 for the selected portions 218 such that the selected portions 218 of the trace layer 126 are opaque on the target region 122.

As the trace layer input 214 is applied to the trace layer 126 the layer generator module 206 detects a resize event 220 and determines based on the resize event 220 that the trace layer 126 is to be resized. Generally, the resize event 220 is triggered in response to a particular state condition pertaining to the trace layer input 214, such as the trace layer input 214 reaching a threshold proximity to an edge of the trace layer 126, the trace layer input 214 reaching a threshold distance from a center of the trace layer 126, and so forth.

Accordingly, the layer generator module 206 resizes the trace layer 126 to generate a resized trace layer 222. The size of the trace layer 126, for instance, is increased to generate the resized trace layer 222. In at least one implementation the layer generator module 206 generates the resized trace layer 222 to be centered on a current position of the trace layer input 214, e.g., a position detected when the resize event 220 occurs. Alternatively the resized trace layer 222 is centered on an initial center of the trace layer 126, e.g., the center of the trace layer 126 when the trace layer 126 was initially positioned by the positioner module 212. The resized trace layer 222 is able to receive further trace layer input 214 to cause selected portions of the resized trace layer 222 to be replicated from the source region 120 to the target region 122.

Further to the system 200b the replicator module 106 receives a save instruction 224 and causes the edited image 116a to be stored with the replicated portion 124 of the source image 114a. The replicated portion 124, for instance, represents the selected portions 218 of the resized trace layer 222 that are replicated to the target region 122 of the source image 114a to generate the edited image 116a. Thus, the systems 200a, 200b depict example attributes of techniques for trace layer for replicating a source region of a digital image described herein.

Figure 3:
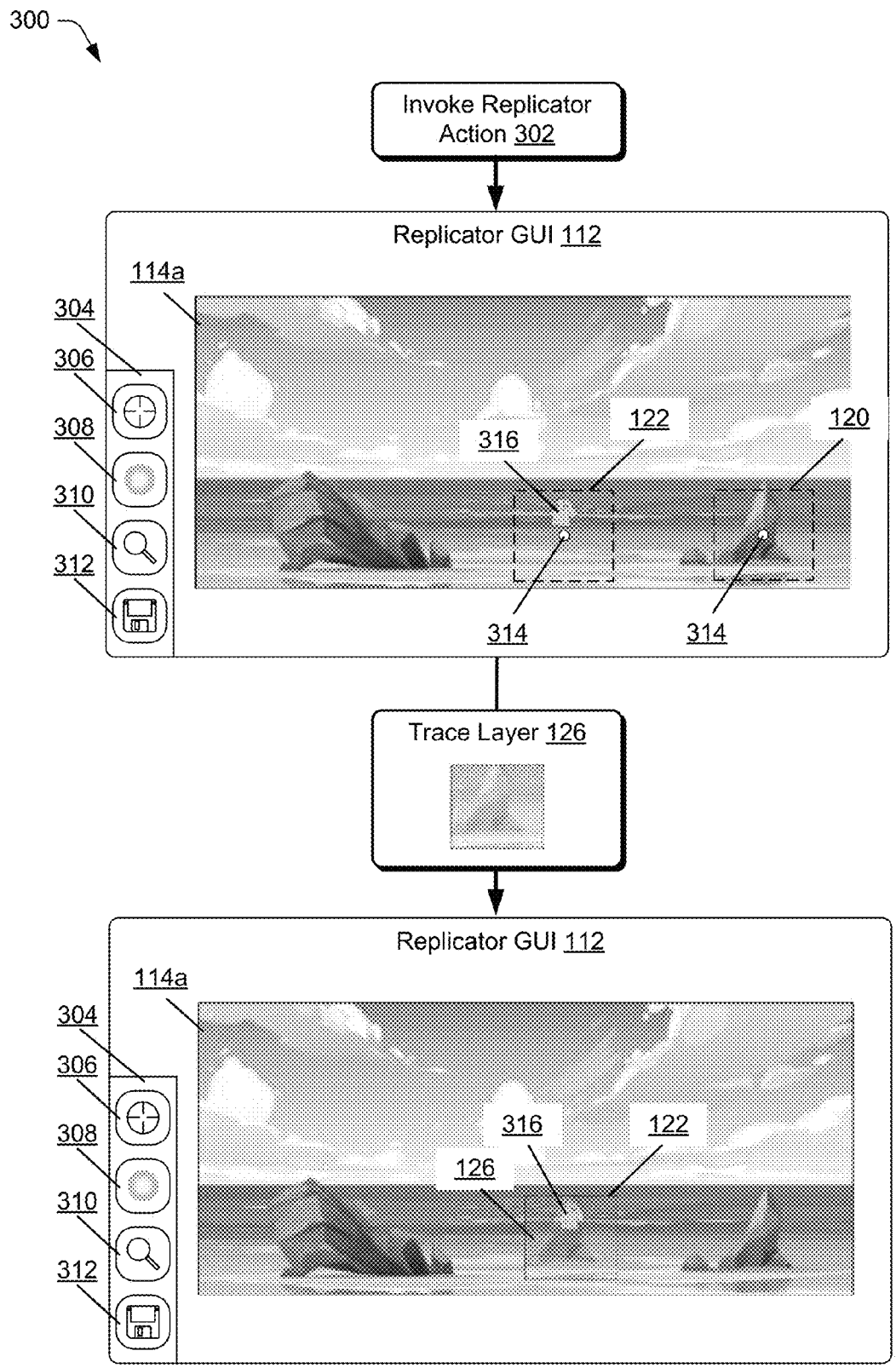
FIG. 3 depicts an example implementation scenario for generating a trace layer in accordance with one or more implementations.

FIG. 3 depicts an example implementation scenario 300 for generating a trace layer in accordance with one or more implementations. In the scenario 300 a user selects the source image 114a and performs an invoke replicator action 302 to invoke functionality of the replicator module 106. The user, for example, interacts with the content editing system 104 select the source image 114a and to invoke the replicator module 106. Accordingly, the replicator module 106 presents the replicator GUI 112 populated with the source image 114a. The replicator GUI 112 also includes a replicator toolbar 304 that is populated with different controls for controlling functionality of the replicator module 106, including a source control 306, a brush control 308, a zoom control 310, and a save control 312. The source control 306 is selectable to enable a user to select a source region from the source image 114a, the brush control 306 is selectable to enable a brush size of an input brush to be adjusted, the zoom control 310 is selectable to enable visual zooming in and zooming out of the source image 114a, and the save control 312 is selectable to save edits applied to the source image 114a.

Further to the scenario 300 a user selects the source control 306 which activates source selection functionality of the replicator module 106. In conjunction with selection of the source control 306 the user selects the source region 120 of the source image 114a. For instance, after selecting the source control 306 the user manipulates a brush tip 314 to select the source region 120. The brush tip 314, for example, represents a selection functionality for interacting with the replicator module 106, such as for applying edits to the source image 114a. The use of a brush and a brush tip is not to be construed as limiting, however, and a variety of different input functionalities are utilizable in accordance with implementations discussed herein.

After selecting the source region 120 the user selects the target region 122 of the source image 114a. The user, for instance, manipulates the brush tip 314 to select the target region 122. Notice in this particular example that the target region 122 includes a visual object 316, e.g., a person.

Accordingly, the replicator module 106 generates the trace layer 126 and positions the trace layer 126 on the target region 122. In at least one implementation dimensions of the trace layer 126 are initially configured based on a size of the brush tip 314. For instance, consider that the brush tip 314 has a diameter d. In at least one implementation the trace layer 126 is initially generated with a width of w*d and a height of h*d, where w, h represent any suitable values such as a prespecified integer values. Generally, the values of w, h are variable in accordance with a display size of a display device on which the source image 114a is displayed. For instance, a smaller display device (e.g., on a smartphone) has smaller values for w, h whereas a larger display device (e.g., for a laptop, a desktop) has larger values for w, h. Further, the trace layer 126 is positionable on the target region 122 such that the trace layer 126 is centered on a selection point for the target region 122, e.g., a point on the source image 114a where user input is received to identify the target region 122.

Further to the scenario 300 notice that the trace layer 126 is generated as partially transparent such that when the trace layer 126 is positioned on the target region 122, portions of the target region 122 are visible underneath the trace layer 126. For instance, the visual object 316 within the target region 122 is visible underneath the trace layer 126. In at least one implementation, the trace layer 126 is generated with a transparency value (e.g., the initial visibility 210) that is based on color values of the source region 120 and the target region 122. For instance, the following equation is utilized to generate a transparency value for the trace layer 126:

$$T(r) = \text{Min}\left(T, \ln(dst) > \ln(src)?\left[\frac{\ln(src)}{\ln(dst)}\text{else}\left[1 - \frac{\ln(dst)}{\ln(src)}\right]\right]\right)$$

where T represents a defined minimum transparency threshold (e.g., as a percentage of a fully opaque value), ln(dst) represents a normalized color intensity of the target region 122, and ln(src) represents a normalized color intensity of the source region 120.

FIGS. 4-7 depict further scenarios for aspects of trace layer for replicating a source region of a digital image in accordance with one or more implementations and to aid in illustration are depicted without the replicator GUI 112. It is to be appreciated, however, that the scenarios are implementable in the context of the replicator GUI 112.

Figure 4:
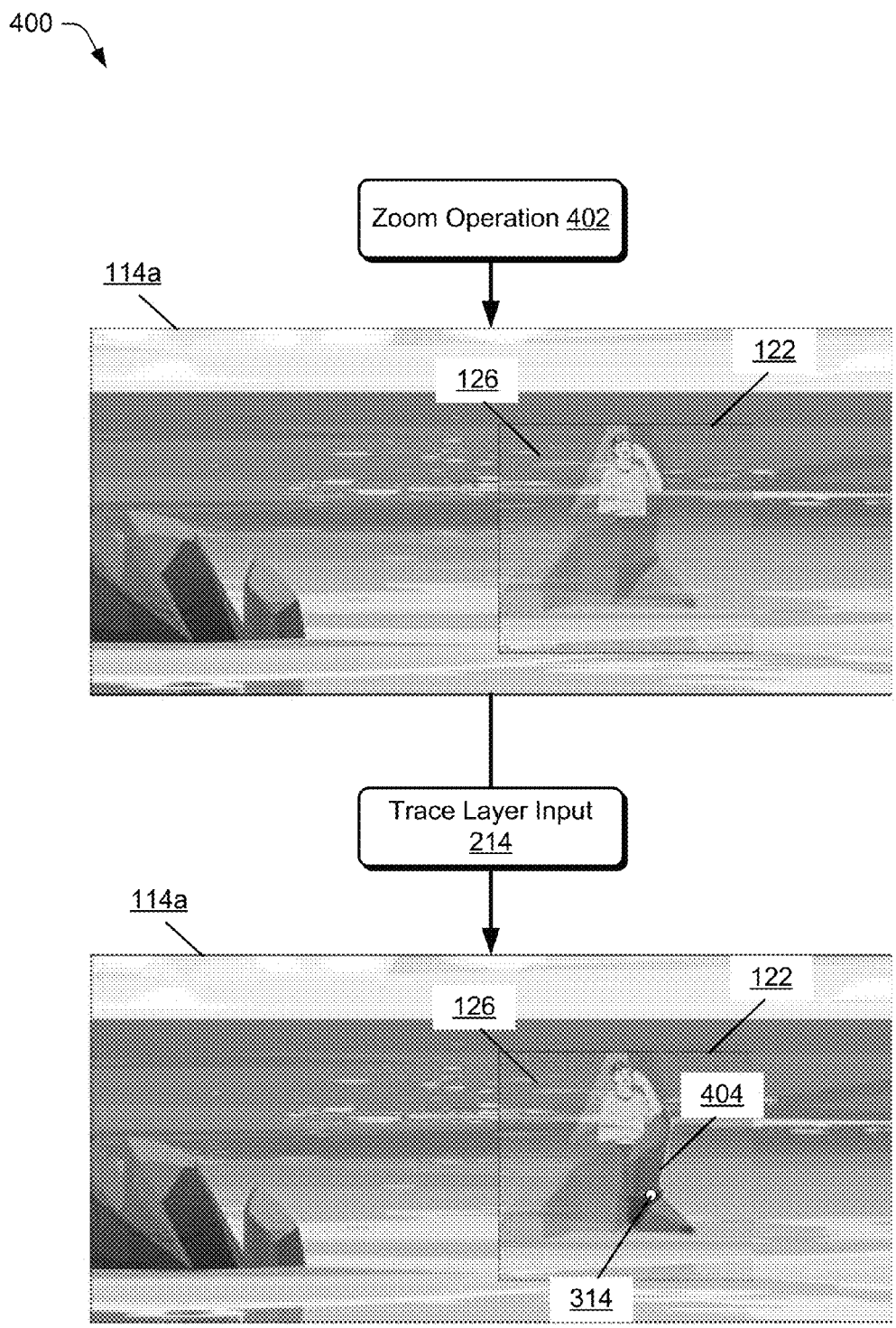
FIG. 4 depicts an example scenario for user interaction with a trace layer in accordance with one or more implementations.

FIG. 4 depicts an example scenario 400 for user interaction with a trace layer in accordance with one or more implementations. The scenario 400, for instance, represents a continuation of the scenario 300. In the upper portion of the scenario 400 a user performs a zoom operation 402 to zoom in on the target region 122 of the source image 114a. The user, for instance, selects the zoom control 310 of the replicator GUI 112 and performs the zoom operation 402. Notice that with the source image 114a zoomed in to the target region 122 the source region 120 is no longer visible. However, with the trace layer 126 positioned on the target region 122 the user is presented with a visual representation of portions of the source region 120.

Continuing to the lower portion of the scenario 400 a user provides the trace layer input 214 to the trace layer 126 to replicate portions of the source region 120 to the target region 122. The user, for instance, manipulates the brush tip 314 to specify replicated portions 404 of the source region 120 to be replicated to the target region 122. Based on the trace layer input 214 the replicator module 106 generates the replicated portions 404 by modifying opacity values of the replicated portions 404. For example, portions of the trace layer 126 selected by the trace layer input 214 are modified to be opaque such that the replicated portions 404 visually overlay corresponding portions of the target region 122. The replicator module 106, for instance, generates the replicated portions 404 utilizing pixel color values from corresponding portions of the source region 120.

Figure 5:
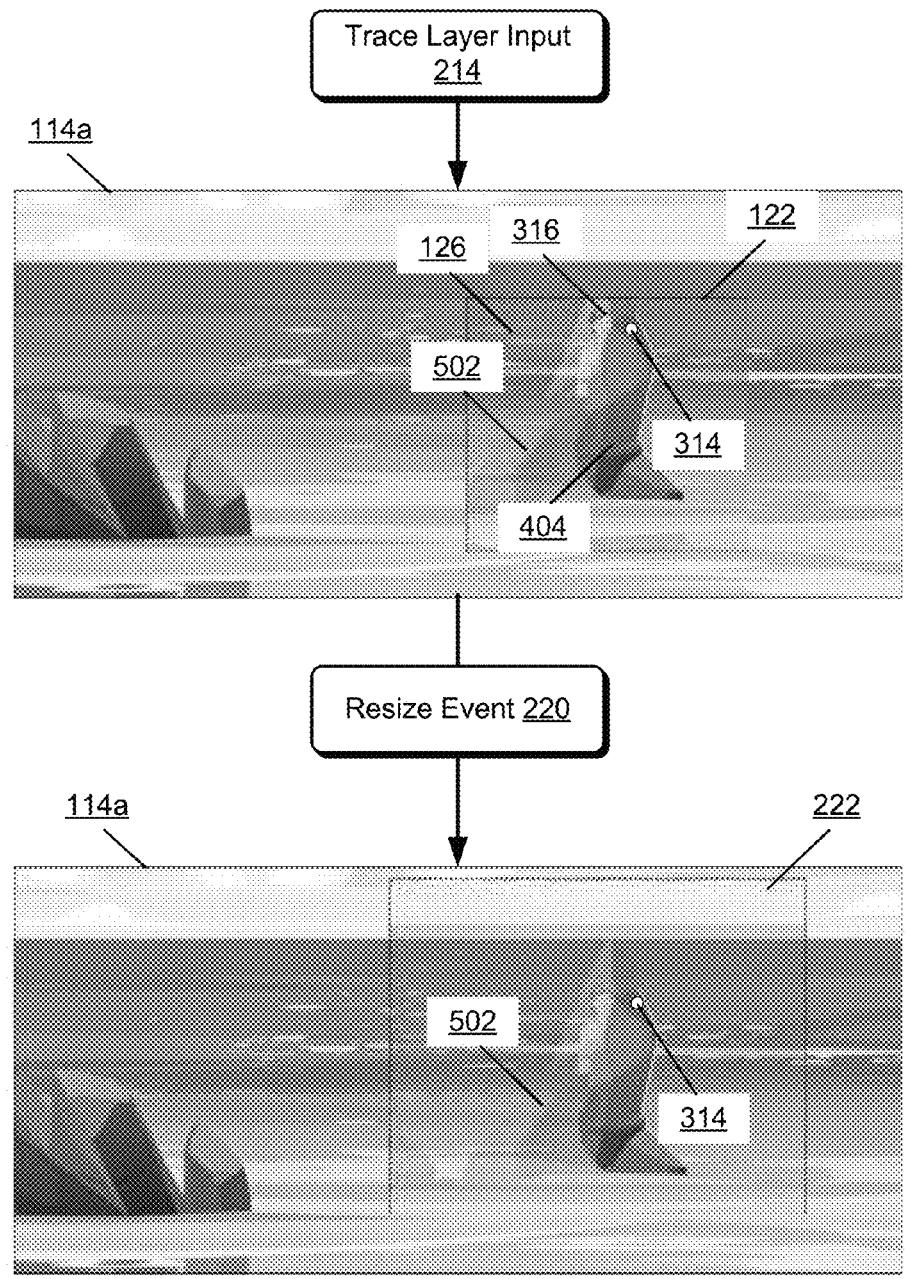
FIG. 5 depicts an example scenario for resizing a trace layer in accordance with one or more implementations.

FIG. 5 depicts an example scenario 500 for resizing a trace layer in accordance with one or more implementations. The scenario 500, for instance, represents a continuation of the scenarios 300, 400. In the upper portion of the scenario 500 a user continues to apply trace layer input 214 to the trace layer 126. As the trace layer input 214 overlaps with the visual object 316 in the target region 122 the modified opacity of the replicated portions 404 causes the replicated portions 404 to visually overlap the target region 122 including the visual object 316.

Further to the scenario 500 a resize event 220 occurs based on the trace layer input 214. The resize event 220, for example, indicates that the trace layer 126 is to be resized. For instance, the user manipulates the brush tip 314 to within a defined threshold proximity to a perimeter of the trace layer 126 to cause the resize event 220. Accordingly, based on the resize event 220 the trace layer 126 is resized to generate a resized trace layer 222. In at least one implementation the trace layer 126 is resized by increasing (e.g., doubling) a size of the trace layer 126 to generate the resized trace layer 222. Further, the resized trace layer 222 is positionable such as by centering the resized trace layer 222 based on a center position of the original trace layer 126.

As part of generating the resized trace layer 222 at least some implementations utilize visual attributes of visual objects included in a source region. For instance, in this particular example the original trace layer 126 includes a visual object 502 that is copied from the source region 120. Accordingly, the replicator module 106 is operable to recognize the visual object 502 and to generate the resized trace layer 222 such that the visual object 502 is encompassed within the resized trace layer 222. The replicator module 106, for instance, utilizes an object recognition algorithm that recognizes the visual object 502 and generates a bounding box for the visual object 502 such that the visual object 502 is included in the resized trace layer 222. For example, when the user interacts with the initial trace layer 126 and the resize event 220 occurs the replicator module 106 recognizes visual objects from the corresponding source region 120 and generates the resized trace layer 222 to include the visual objects which in this example includes the visual object 502.

Figure 6:
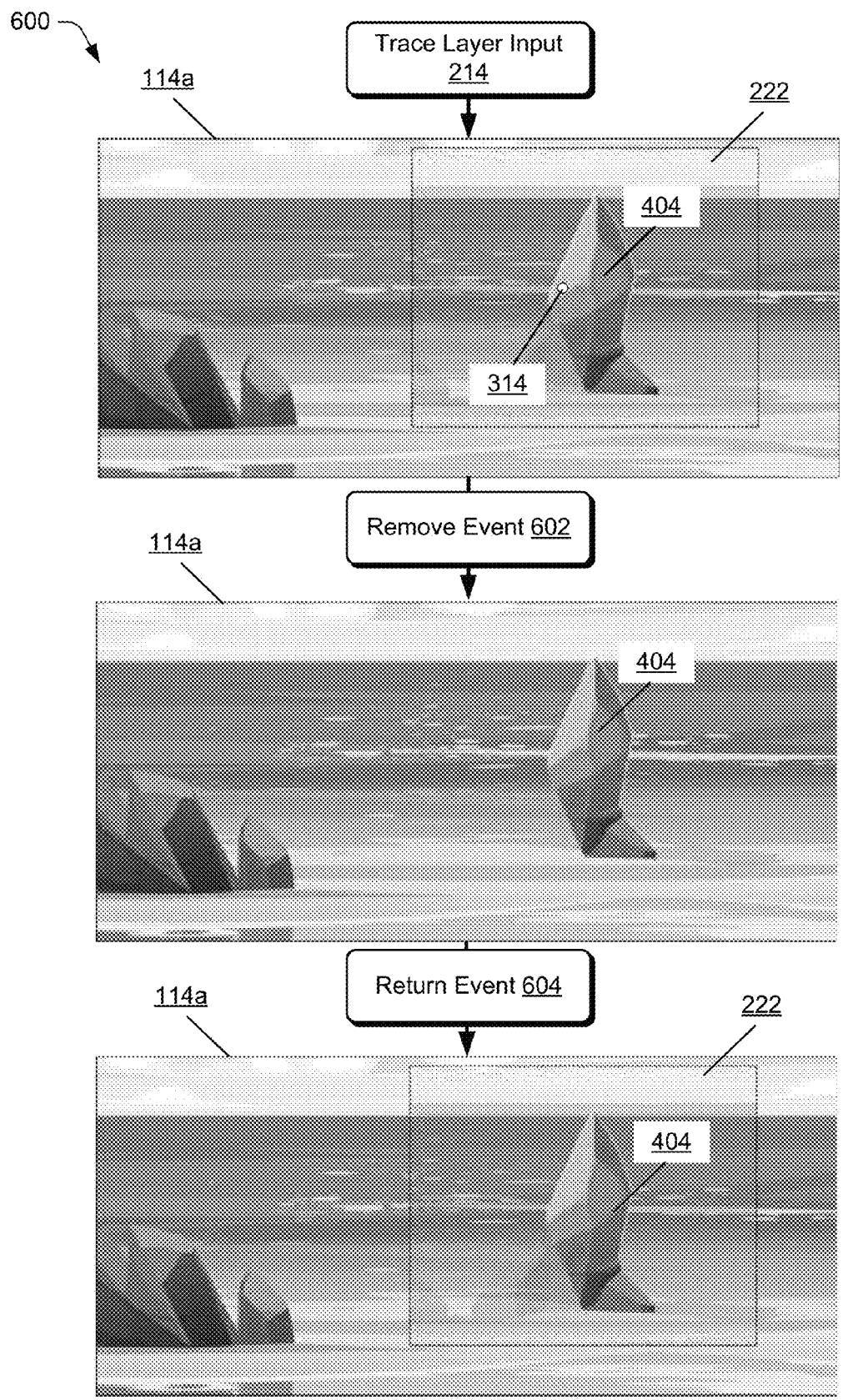
FIG. 6 depicts an example scenario for modifying presentation of a trace layer in accordance with one or more implementations.

FIG. 6 depicts an example scenario 600 for modifying presentation of a trace layer in accordance with one or more implementations. The scenario 600, for instance, represents a continuation of the scenarios 300-500. In the upper portion of the scenario 600 a user continues to apply trace layer input 214 to the resized trace layer 222 to generate additional replicated portions 404. Proceeding to the center portion of the scenario 600 a remove event 602 occurs indicating that the trace layer 126 is to be removed from display. The remove event 602, for instance, occurs in response to the user pausing the trace layer input 214. For example, in a scenario where the user provides the trace layer input 214 via touch input, the user stops providing touch input. In at least one implementation the replication module 106 utilizes a timer for the remove event 602. For instance, when the user pauses the trace layer input 214 the replication module 106 starts the timer and when the timer elapses prior to receiving further trace layer input 214 the remove event 602 occurs.

Accordingly, based on the remove event 602, in the center portion of the scenario 600 the resized trace layer 222 is removed from display. The replicated portions 404 remain displayed but the resized trace layer 222 is removed from display on the source image 114a. Generally, this provides a user with a view of the source image 114a with the replicated portions 404 displayed on the target region 122.

Proceeding to the lower portion of the scenario 600 a return event 604 occurs and thus the resized trace layer 222 is returned to display on the source image 114a. For instance, after pausing the trace layer input 214 and removal of the resized trace layer 222 from display the user provides further input to the target region 122 which causes the return event 604 and triggers the replicator module 106 to return the resized trace layer 222 to display. Accordingly, the user is able to resume trace layer input 214 to the resized trace layer 222.

Figure 7:
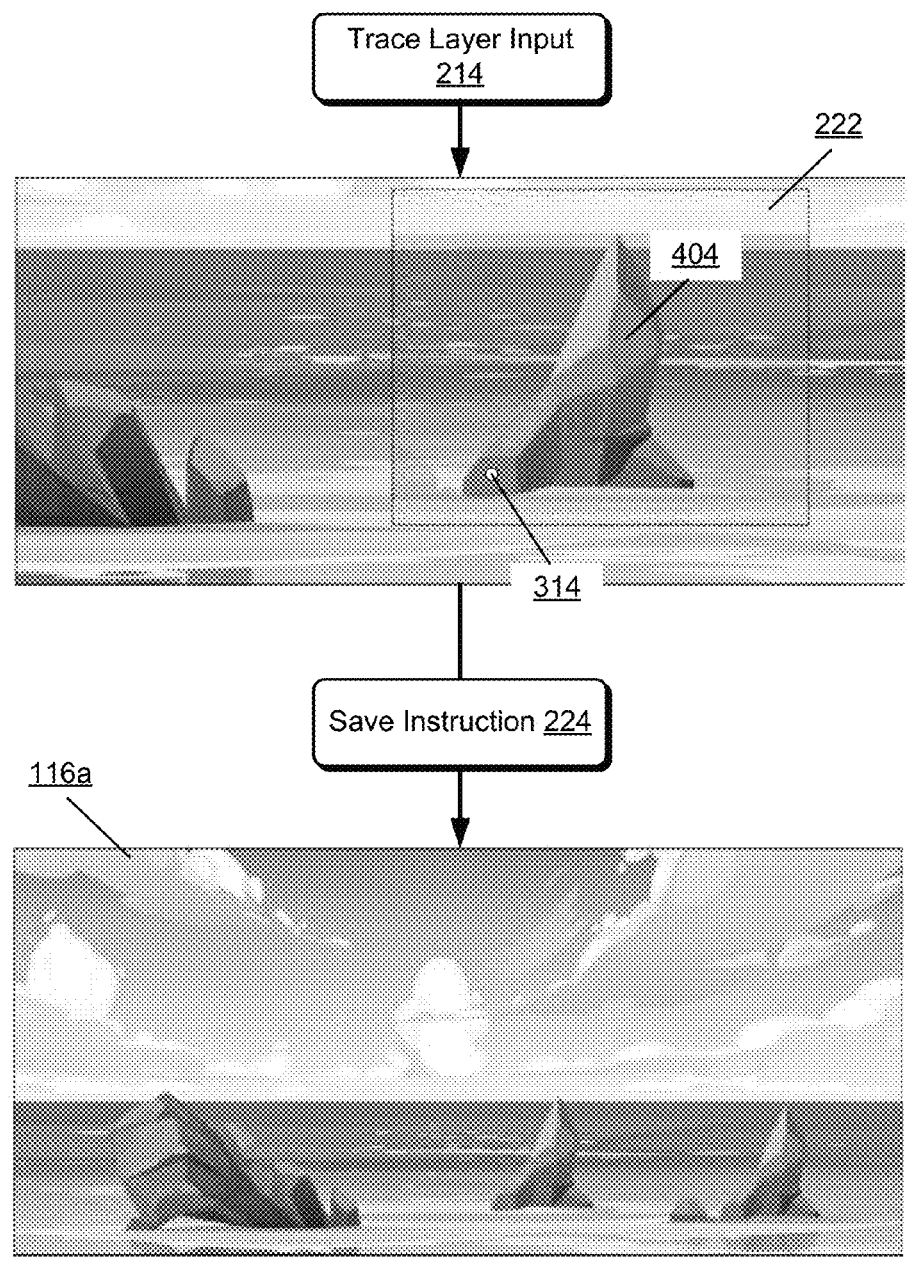
FIG. 7 depicts an example scenario for generating an edited image based on input to a trace layer in accordance with one or more implementations.

FIG. 7 depicts an example scenario 700 for generating an edited image based on input to a trace layer in accordance with one or more implementations. The scenario 700, for instance, represents a continuation of the scenarios 300-600. In the upper portion of the scenario 700 a user continues to apply trace layer input 214 to the resized trace layer 222 to generate further replicated portions 404 of the resized trace layer 222. Proceeding to the lower portion of the scenario 700 a save instruction 224 is received indicating that the source image 114a is to be modified to include the replicated portions 404 and to generate an edited image 116a. Accordingly, the edited image 116a is illustrated as zoomed out from the previous view and as including the replicated portions 404 from the resized trace layer 222. Notice that in the edited image 116a portions of the resized trace layer 222 that are not selected as part of the trace layer input 214 are not included as part of the edited image 116a.

Example Procedures

The following discussion describes procedures that are implementable utilizing the previously described systems and devices. Aspects of the procedures are able to be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-7.

Figure 8:
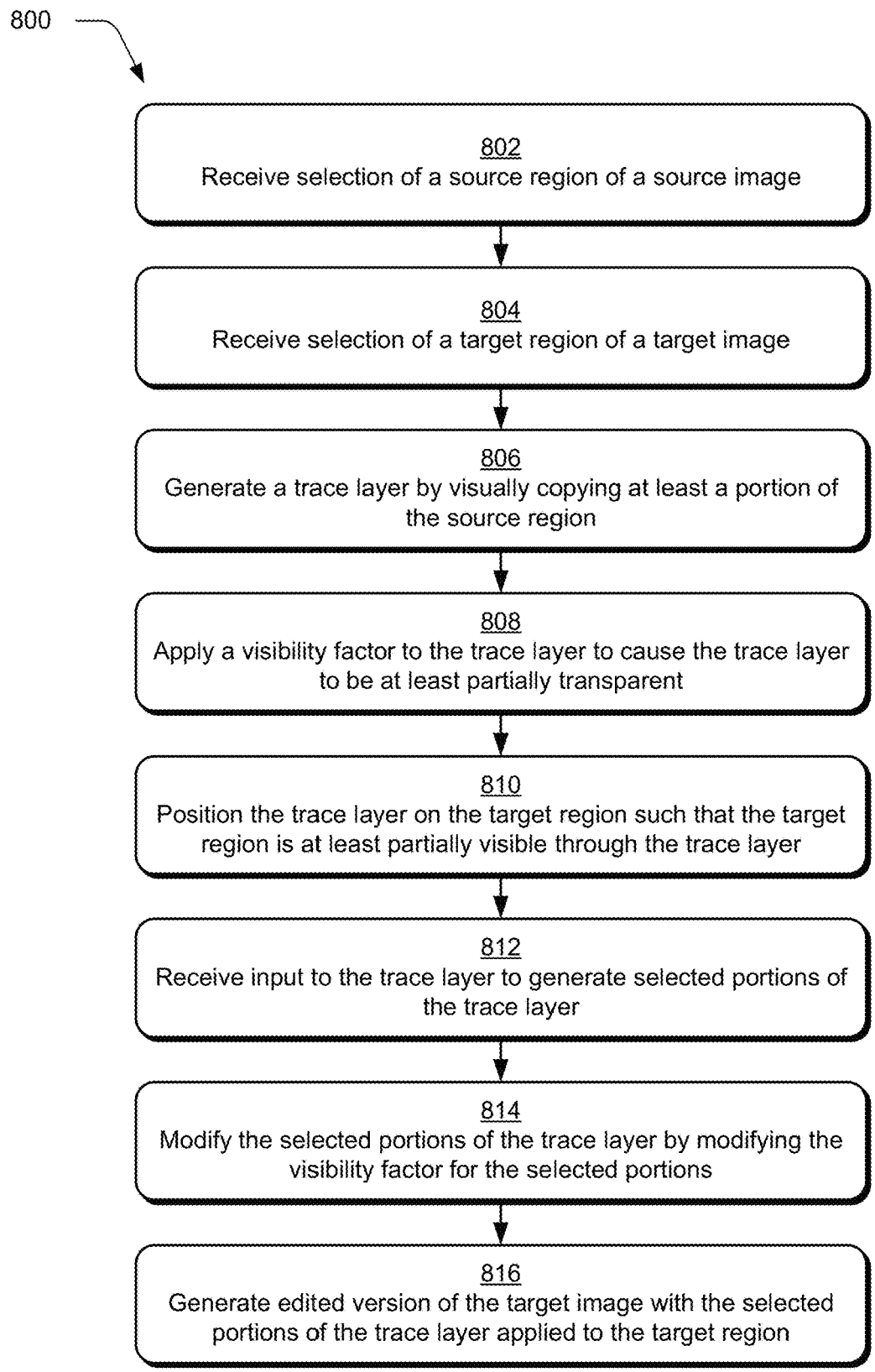
FIG. 8 depicts a procedure in an example implementation for trace layer for replicating a source region of a digital image.

FIG. 8 depicts a procedure 800 in an example implementation for trace layer for replicating a source region of a digital image. Step 802 receives selection of a source region of a source image. A user, for instance, selects a source image 114, invokes the replicator module 106, and selects a source region of the source image 114. Step 804 receives selection of a target region of a target image. A user, for instance, selects a target region of a target image for placement of the trace layer. In at least one implementation the source image and the target image represent the same image. Alternatively the target image is a different image than the source image.

Step 806 generates a trace layer by visually copying at least a portion of the source region. The replicator module 106, for example, generates a copy of a portion of the selected source region. As referenced above an initial size of the trace layer is configurable based on an input functionality utilized to select the source region, such as a brush tip size. Step 808 applies a visibility factor to the trace layer to cause the trace layer to be at least partially transparent. For instance, the replicator module 106 generates the visibility factor as a transparency value for the trace layer. As referenced above, for example, the visibility factor is generated based on a color intensity of the source region and/or a color intensity of the selected target region.

Step 810 positions the trace layer on the target region such that the target region is at least partially visible through the trace layer. The replicator module 106, for instance, centers the trace layer on the target region. Step 812 receives input to the trace layer to generate selected portions of the trace layer. A user, for instance, manipulates the input functionality to select portions of the trace layer. Step 814 modifies the selected portions of the trace layer by modifying the visibility factor for the selected portions. For example, based on the user input to select the selected portions of the trace layer, the replicator module 106 modifies the visibility factor to decrease transparency of the selected portions of the trace layer on the target region of the target image. In at least one implementation modifying the visibility factor causes the selected portions to be opaque and overlay corresponding portions of the target region. Step 816 generates an edited version of the target image with the selected portions of the trace layer applied to the target region. The replicator module 106, for instance, causes the content editing system 104 to store an edited version of the target image that includes the selected portions of the trace layer applied to the target region of the target image.

FIG. 9 depicts a procedure 900 in an example implementation for resizing a trace layer. The procedure 900, for instance, is implemented in conjunction with the procedure 800. Step 902 determines that a resize event occurs based on input to a trace layer. The replicator module 106, for instance, determines that user input to select portions of the trace layer causes a resize event. Generally, various conditions are usable to cause a resize event, such as user input reaching a threshold proximity to a perimeter of the trace layer and/or user input reaching a threshold distance from a center of the trace layer.

Step 904 generates a resized trace layer. The replicator module 106, for instance, increases a size of the trace layer in response to the resize event. In at least one implementation the resized trace layer is generated by visually copying a further portion of the source region and including the further portion of the source region as part of the resized trace layer. Accordingly, the resized trace layer is configured to receive user input to designate portions of a source region to be replicated to a target region. In at least one implementation the procedure 900 is performable dynamically to resize a trace layer (e.g., multiple times) such as based on user interaction with the trace layer.

Figure 10:
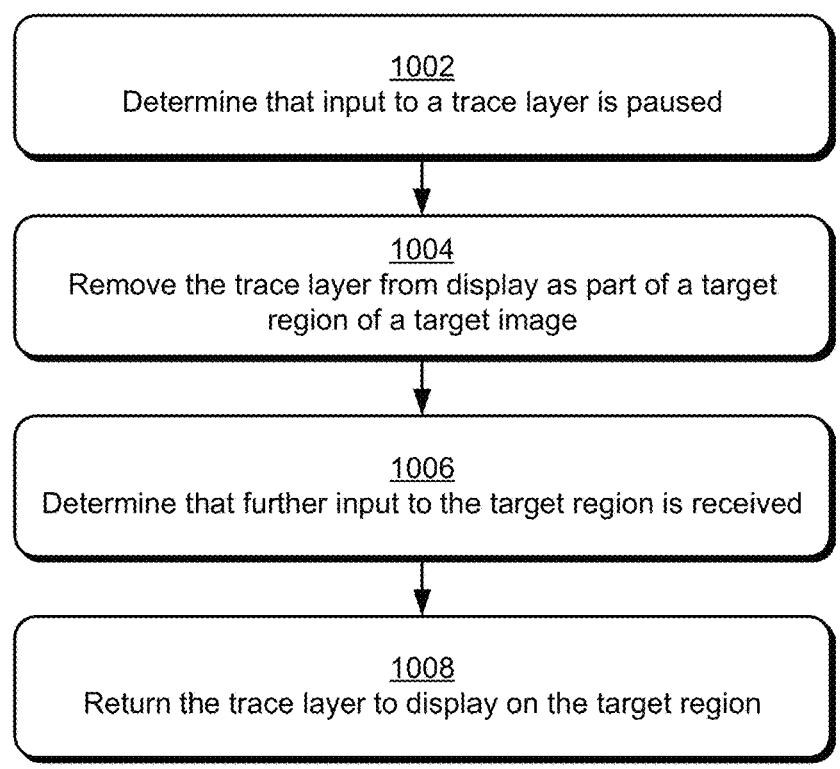
FIG. 10 depicts a procedure in an example implementation for modifying visibility of a trace layer.

FIG. 10 depicts a procedure 1000 in an example implementation for modifying visibility of a trace layer. The procedure 1000, for instance, is implemented in conjunction with the procedure 800 and/or the procedure 900. Step 1002 determines that input to a trace layer is paused. The replicator module 106, for example, detects that user input to a trace layer stops, such as for a threshold period of time. Step 1004 removes the trace layer from display as part of a target region of a target image. For instance, in response to detecting the pause in user input to the trace layer the replicator module 106 removes the trace layer from display. Further, the replicator module 106 maintains display of selected portions of the trace layer on a target region of a target image.

Step 1006 determines that further input to the target region is received. The replicator module 106, for example, detects that a user resumes providing input to the target region. Step 1008 returns the trace layer to display on the target region. For instance, the replicator module 106 returns the trace layer to display on the target region in response to detecting the further input. In at least one implementation the procedure 1000 is performable dynamically to present and remove a trace layer such as based on changes in user interaction with the trace layer.

In conclusion, techniques for trace layer for replicating a source region of a digital image enable visual attributes of a source region of a source image to be visually represented using a partially transparent visual representation of the visual attributes. Further, the visual representation is operable to receive user interaction to visually replicate portions of the source region, which is not possible using convention techniques.

Example System and Device

Figure 11:
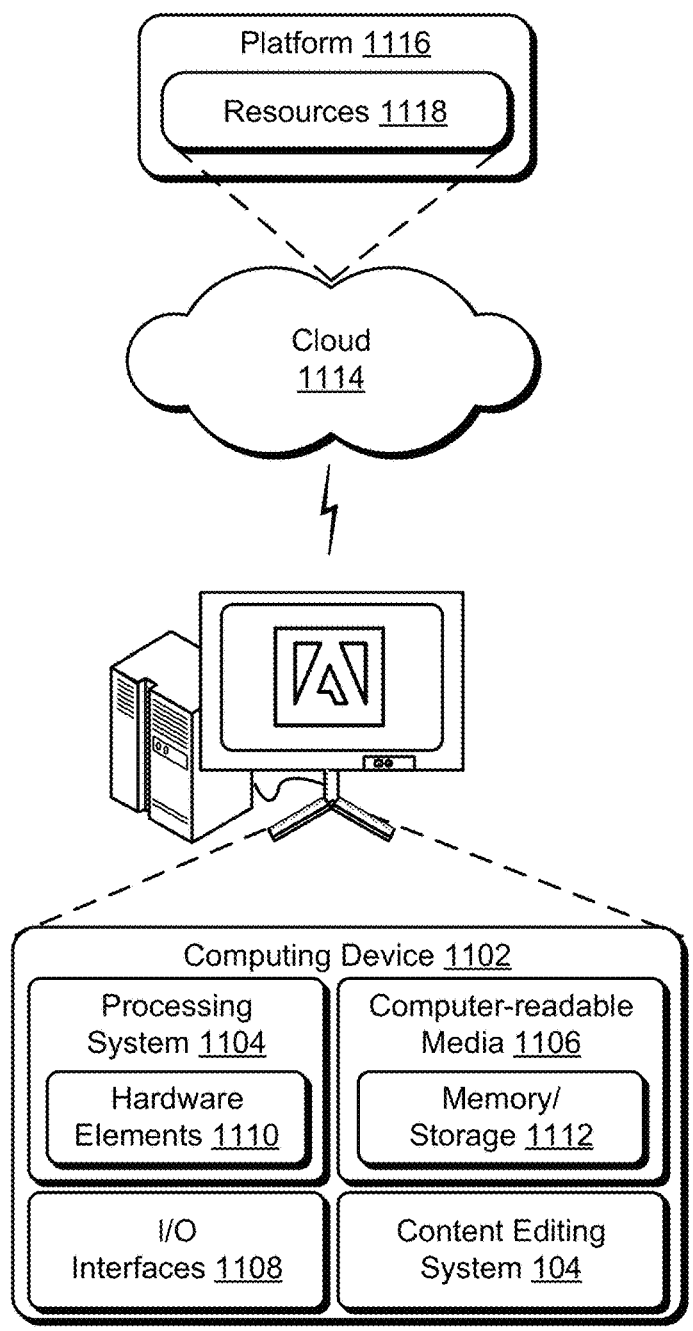
FIG. 11 illustrates an example system that includes an example computing device that is representative of one or more computing systems and/or devices that implement the various techniques described herein.

FIG. 11 illustrates an example system generally at 1100 that includes an example computing device 1102 that is representative of one or more computing systems and/or devices that implement the various techniques described herein, and represents an example implementation of the computing device 102. This is demonstrated via inclusion of the content editing system 104. The computing device 1102, for example, represents a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that are be configured as processors, functional blocks, and so forth. This includes example implementations in hardware as an application specific integrated circuit or other logic device formed using one or more semiconductors. The hardware elements 1110 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1106 is illustrated as including memory/storage 1112. The memory/storage 1112 represents memory/storage capacity associated with one or more computer-readable media. In one example, the memory/storage component 1112 includes volatile media (such as random access memory (RAM)) and/or nonvolatile media (such as read only memory (ROM), Flash memory, optical disks, magnetic disks, and so forth). In another example, the memory/storage component 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1110. For example, the computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supportable by various configurations of the computing device 1102 and are not limited to the specific examples of the techniques described herein. This functionality is also implementable entirely or partially through use of a distributed system, such as over a "cloud" 1114 as described below.

The cloud 1114 includes and/or is representative of a platform 1116 for resources 1118. The platform 1116 abstracts underlying functionality of hardware (e.g., servers) and software resources of the cloud 1114. For example, the resources 1118 include applications and/or data that are utilized while computer processing is executed on servers that are remote from the computing device 1102. In some examples, the resources 1118 also include services provided over the Internet and/or through a subscriber network, such as a cellular or Wi-Fi network.

The platform 1116 abstracts the resources 1118 and functions to connect the computing device 1102 with other computing devices. In some examples, the platform 1116 also serves to abstract scaling of resources to provide a corresponding level of scale to encountered demand for the resources that are implemented via the platform. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving, by the at least one computing device, selection of a source region of a source image;
   receiving, by the at least one computing device, selection of a target region of a target image;
   generating, by the at least one computing device, a trace layer by visually copying at least a portion of the source region, applying a visibility factor to the trace layer to cause the trace layer to be at least partially transparent, and positioning the trace layer on the target region such that the target region is at least partially visible through the trace layer;

receiving, by the at least one computing device, input to the trace layer to generate selected portions of the trace layer; and modifying, by the at least one computing device, the selected portions of the trace layer by modifying the visibility factor for the selected portions to decrease transparency of the selected portions of the trace layer on the target region of the target image.

2. The method as described in claim 1, wherein selection of the source region is received via an input functionality with a specified size and said generating the trace layer comprises specifying an initial size of the trace layer based on the specified size of the input functionality.

3. The method as described in claim 1, wherein said receiving selection of the target region comprises detecting a selection point on the target region, and wherein said positioning the trace layer comprises positioning the trace layer as centered on the selection point on the target region.

4. The method as described in claim 1, further comprising generating the visibility factor based on at least one color value of the source region and at least one color value of the target region.

5. The method as described in claim 1, wherein said modifying the visibility factor for the selected portions causes the selected portions to be opaque on the target region of the target image.

6. The method as described in claim 1, further comprising: receiving further input to the trace layer to generate further selected portions of the trace layer; determining that the further input to the trace layer causes a resize event to occur; and generating a resized trace layer by visually copying a further portion of the source region and including the further portion of the source region as part of the resized trace layer.

7. The method as described in claim 6, wherein the resize event is based on the further input to the trace layer reaching a threshold distance from a perimeter of trace layer.

8. The method as described in claim 1, further comprising: determining that input to the trace layer is at least partially paused; and removing the trace layer from display and maintaining display of the selected portions of the trace layer on the target region of the target image.

9. In a digital medium graphics editing environment, a system comprising:
a processing system stored on memory; and
a replicator module implemented at least partially in hardware of the system and being executable by the processing system to:
generate a trace layer including to visually copy at least a portion of a source region of a source image and apply a visibility factor to the trace layer to cause the trace layer to be at least partially transparent;
position the trace layer on a target region of a target image such that the target region is at least partially visible through the trace layer; receive input to the trace layer to generate selected portions of the trace layer; and
modify the selected portions of the trace layer including to modify the visibility factor to decrease transparency of the selected portions of the trace layer on the target region of the target image.

10. The system as described in claim 9, wherein the replicator module is further implemented to: receive selection of the source region and generate the trace layer based on selection of the source region; and receive selection of the target region and position the trace layer on the target region based on selection of the target region.

11. The system as described in claim 9, wherein the replicator module is further implemented to receive selection of the source region via an input functionality and generate the trace layer based on a size of the input functionality.

12. The system as described in claim 9, wherein the replicator module is further implemented to generate the visibility factor based on at least one of a color value of the source region or a color value of the target region.

13. The system as described in claim 9, wherein the replicator module is further implemented to: receive further input to the trace layer to generate further selected portions of the trace layer; determine that the further input to the trace layer causes a resize event to occur; and generate a resized trace layer including to visually copy a further portion of the source region and include the further portion of the source region as part of the resized trace layer.

14. The system as described in claim 13, wherein the resize event is based on the further input to the trace layer reaching a threshold distance from a perimeter of trace layer.

15. The system as described in claim 9, wherein the replicator module is further implemented to: determine that input to the trace layer is at least partially paused; and remove the trace layer from display and maintain display of the selected portions of the trace layer on the target region of the target image.

16. The system as described in claim 15, wherein the replicator module is further implemented to: determine that further input to the target region is received; and return the trace layer to display on the target region.

17. One or more computer-readable storage media storing instructions that, responsive to execution by a computing device, cause the computing device to perform operations comprising:
generating a trace layer by visually copying a first portion of a source region of a source image and applying a visibility factor to the trace layer to cause the trace layer to be at least partially transparent;
positioning the trace layer on a target region of a target image such that the target region is at least partially visible through the trace layer;
modifying selected portions of the trace layer including modifying the visibility factor to decrease transparency of the selected portions of the trace layer on the target region of the target image;
detecting a resize event indicating that the trace layer is to be resized on the target region of the target image; and
generating a resized trace layer by visually copying a second portion of the source region and including the second portion of the source region as part of the resized trace layer.

18. The one or more computer-readable storage media of claim 17, wherein said positioning the trace layer on a target region of a target image comprises receiving input via an input functionality to select the target region, and wherein said generating the trace layer comprises specifying an initial size of the trace layer based on the specified size of the input functionality.

19. The one or more computer-readable storage media of claim 17, wherein said generating the resized trace layer further comprises recognizing a visual object included in the source region and visually copying the second portion of the source region to encompass the visual object within the resized trace layer.

20. The one or more computer-readable storage media of claim 17, wherein the operations further comprise: determining that input to the trace layer is at least partially paused; removing the trace layer from display and maintaining display of the selected portions of the trace layer on the target region of the target image; determining that further input to the target region is received; and returning the trace layer to display on the target region.

* * * * *